P. H. FLANSBURGH.
Side-Hill Plow.
No. 66,012. Patented June 25, 1867.
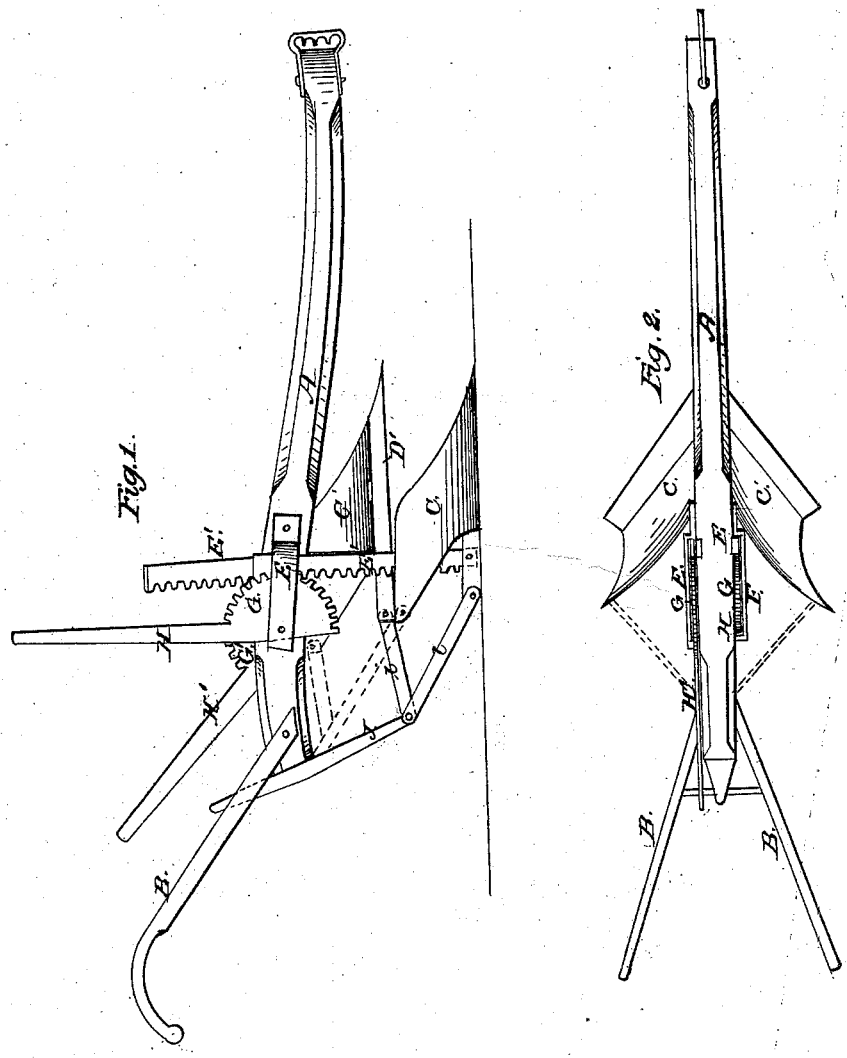

United States Patent Office.

PETER H. FLANSBURGH, OF EDEN TOWNSHIP, CALIFORNIA.

Letters Patent No. 66,012, dated June 25, 1867.

IMPROVEMENT IN SIDE-HILL PLOUGHS.

The Schedule referred to in these Letters Patent and making part of the same.

TO ALL WHOM IT MAY CONCERN:

Be it known that I, PETER HARAWER FLANSBURGH, of Eden township, Alameda county, State of California, have invented certain new and useful Improvements in "Side-Hill Ploughs;" and I do hereby declare the following description and accompanying drawings are sufficient to enable any person skilled in the art or science to which it most nearly appertains to make and use my said invention or improvements without further invention or experiment.

The nature of my invention relates to that class of ploughs known as double or side-hill ploughs; and has for its object an improvement in the mechanism by which the ploughs are alternately engaged and disengaged as the plough goes across the field or back, raising one plough when the other is engaged, and thus turning the furrows all in one direction.

This is accomplished by constructing two ploughs, one right and the other left-hand, both attached to one beam, and so placed that the land-sides may be parallel and close together when both ploughs are on the ground in working order. Two vertical racks or standards are fastened, one to each land-side, and pass through supports on each side of the beam. A segmental pinion works each of these racks or standards, each being operated by a lever independent of the other, so that both ploughs may be raised or lowered at the same time, or one raised and the other lowered. A hinge may be employed in place of the racks and pinions to raise and lower the ploughs and the same end attained. To more fully explain my invention reference is had to the accompanying drawings, forming part of this specification, of which—

Figure 1 is a side elevation, with one plough raised and the other depressed.

Figure 2 is a plan.

Similar letters of reference indicate like parts.

A is the beam of the plough, having handles, B B. Two mould-boards C C', one turning a right and the other a left-hand furrow, are placed so that the land-sides D and D' are parallel and close together when both are resting on the ground. E and E' are vertical racks, attached one to each land-side, and extending upwards, being supported one each side of the beam by the plates F F. The toothed segments G G' operated by the levers H and H' serve to move these racks and their attached ploughs up or down as may be required. The braces I and I' extending from the ends of the land-side back to the support J, together with braces from the upper extremities of the mould-boards, serve to strengthen and steady the ploughs in their upward and downward movements.

To operate this mechanism, when at one end of the furrow both ploughs are let down till they stand upon the ground. One lever is then drawn back until the plough which it moves is raised to a sufficient height to clear the ground when the other is turning the furrow, and the lever is retained in place by a catch, which holds it firmly. At the end of the furrow this plough is let down and the other raised. By operating it in this manner only the weight of one plough has to be raised by its lever, whereas if only one lever is used to operate both, the ploughs must be first raised by the handles till the point of the beam rests on the ground, while the lever must be thrown over so far as to be out of reach of the driver. By this arrangement the ploughs may be both raised or both lowered, or separated vertically, as far as desired.

Having thus described my invention, what I claim, and desire to secure by Letters Patent, is—

1. The two plates C C', placed side by side, and operating independent of each other, either by a hinge, or rack and pinion, substantially as herein described.

2. The levers H and H', with the toothed segments G and G', operating the ploughs by means of the independent vertical racks E and E', substantially as and for the purpose described.

In witness whereof I have hereunto set my hand and seal.

PETER H. FLANSBURGH. [L. S.]

Witnesses:
C. W. M. SMITH,
GEO. H. STRONG.